Figure 3:
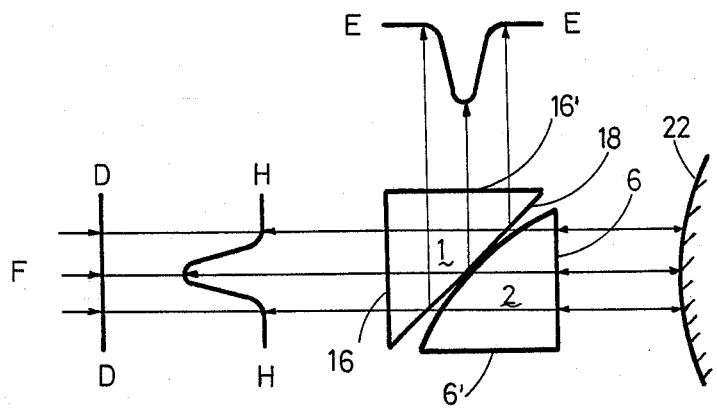

United States Patent [19]

Armandillo et al.

[11] Patent Number: 4,752,122
[45] Date of Patent: Jun. 21, 1988

[54] APODIZING FILTER AND ITS APPLICATIONS

[75] Inventors: Errico Armandillo, Frascati; Gianemilio Salvetti, Rome; Giampiero Giuliani, Rome; Elia Palange, Rome, all of Italy

[73] Assignee: Enea-Comitato Nazionale per la Ricerca e lo Sviluppo Dell'energia Nucleare e Delle Energie Alternative, Rome, Italy

[21] Appl. No.: 838,810

[22] Filed: Mar. 12, 1986

[30] Foreign Application Priority Data

Mar. 13, 1985 [IT] Italy .............................. 47805 A/85

[51] Int. Cl.4 ...................... G02B 5/04; G02B 17/00
[52] U.S. Cl. ................................. 350/448; 350/286
[58] Field of Search .............. 350/448, 286, 359, 363; 372/100

[56] References Cited

PUBLICATIONS

Dubé, "Total Internal Reflection Apodizers"; Optics Communications, vol. 12, No. 3, 11/1974, pp. 344–347.

Jenkins et al., "Penetration upon Reflection", *Fundamentals of Optics*, pp. 580–581.

Primary Examiner—John K. Corbin
Assistant Examiner—Rebecca D. Gass
Attorney, Agent, or Firm—Stevens, Davis, Miller & Mosher

[57] ABSTRACT

An apodizing filter is disclosed comprising two solid bodies of transparent material the first of which is struck by the incident light while the second receives the light from the first. The second body has a curve surface approaching the first body at a distance therefrom not greater than some wavelengths of the incident light. The plane tangent to the curve surface of the second body at the point of minimum distance from the first one forms with the direction of the incident light an angle greater than the limit angle of the total reflection related to the first body with respect to the medium in which the filter is sunk. The indexes of refraction of the two materials of which the two bodies are made are such that the light incidence on said tangent plane is lower than the limit angle of the total reflection. The combination is disclosed of the aoditic filter according to this invention with a mirror and an example is given of the filter application to a laser cavity.

2 Claims, 2 Drawing Sheets

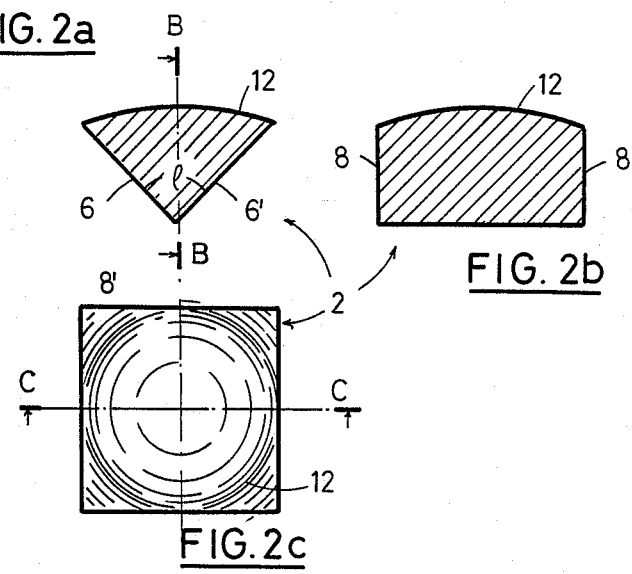
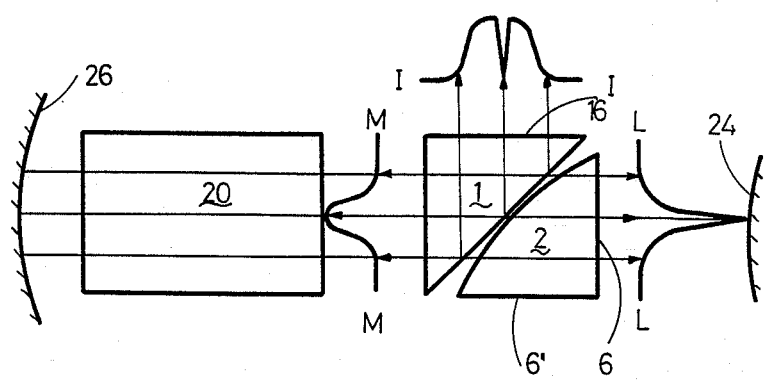

APODIZING FILTER AND ITS APPLICATIONS

The object of the present invention relates to the following:
(a) a spatial apodizing filter that is filter adapted for suppressing or at least reducing the border effects and consequently such that a light beam is obtained which is totally or near totally free from diffraction effects,
(b) the combination of said filter with a mirror that is a device operating as an apodizing mirror, and lastly
(c) the combination of an apodizing mirror with an optical resonator of which the distortions are filtered by said apodizing filter which are produced by the passive elements (such as lenses, etc) and/or active elements (such as optical amplifiers, etc).

The apodizing filters known up to now are based on the deposition of thin films with a thickness which varies radially on substrates of transparent or non transparent material. The results up to now have been unsatisfactory in as much as the so developed filters suffer from the following drawbacks:
(a) a limited spectral field;
(b) the bandwidth at half height of the transmission peak cannot be reduced as small as wanted;
(c) the damage threshold is low.

Recently, by U.S. Pat. No. 3,663,087 dated on May 16, 1972 (Inventors Guillet et al) an apodizing filter was disclosed comprising a pair of parallel or crossed polarizers between which a device was interposed which had a rotatory or birefrangent optic power radially variable. Such device according to the above patent can comprise:
(1) A Faraday rotator;
(2) A Pockels cell
(3) A birefringent lens;
(4) A birefringent afocal doublet.

The drawbacks of a filter so developed are as follows:
(a) limited spectral field
(b) periodicity of the transmission peak due to the use of spherical lenses in the afocal doublet.

According to this invention an apodizing filter is realized of novel idea which comprises two bodies of transparent material of which the refraction indexes are the same or different from one another. The two bodies are generally polyhedra that is they are defined by flat polygonal surfaces, but one of the surfaces of at least one of the polyhedra is a curve surface either concave or convex which may also be a cylindrical surface or a quadric surface that is an ellipsoid, a paraboloid, a hyperboloid.

The filter is realized by approaching the curve surface of that body which owns such a surface to the curve surface of the other body or, whenever that the latter body does not own any such surface, to one of the flat surfaces thereof. Whenever one of the above surfaces to be reciprocally approached is a concave one, the other will be convex.

The two surfaces as above are approached to one another in a reciprocal quasi-tangent position or quasi-osculatory position, being reciprocally separated by a narrow interval between the respective points of minimum distance or between the respective generatrices of minimum distance which will be small at will but anyway not larger than a few wavelengths of the light to be apodizated. The interval between the two surfaces will be obviously increased whenever the distance is increased from the minimum distance points or minimum distance generatrices between the surfaces.

If, in the following we refer simplicity to a couple of bodies which when approached to one another give way to a punctual tangency, let us suppose that one of them has such form, attitude and refraction index that a light beam be refracted thereby which impinges thereon whenever this body is isolated from the other.

Whenever the second body of the couple is approached to the first body at said tangency point, the light fraction refracted within the area centered in the tangency point will change as a function of the indexes and of the distance between the respective punctual distance of the two bodies.

The profile of the light, emerging from the filter presents a transmission peak which depends on the distance between the two approached surfaces and on the indexes of refraction of the materials of the two bodies. Whenever the distance between the two surfaces is changed the filter transmission peak changes in the meaning that when said distance is increased, the peak intensity decreases and vice versa there will be a maximum of intensity for distances between the two surfaces close to zero (punctual optical contact).

The measured bandwidth as measured at half the peak height depends on the curvature radius of the pair of reciprocally faced surfaces in the meaning that by lowering the separation gradient of the two surfaces that is, for instance, by increasing the curvature radius of the curve surface when the other surface is plane, the bandwidth decreases.

In the extreme, in the case that the facing surfaces are both flat, the filter will produce no apodization effect.

This invention will be better understood from the following description and the united drawings which illustrate as an example a preferred embodiment thereof.

Figure 1:
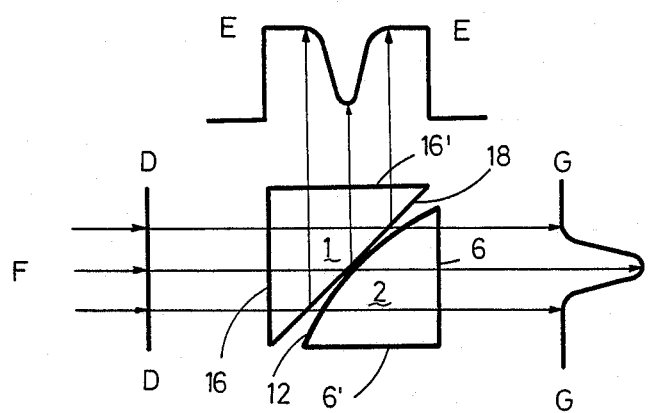

In the drawings:
FIG. 1 shows the scheme of an apodizing filter according to this invention;
FIGS. 2a, 2b, 2c show respectively a diametrical cross section of the body with curved surface of FIG. 1, a diametrical section perpendicular to FIG. 2a and a top plan view of the same body of FIGS. 2a and 2b;
FIG. 3 shows the scheme of an apodizing filter combined with a convex mirror;
FIG. 4 shows the scheme of an apodizing filter applied to a laser cavity.

With reference to FIG. 1 an apodizing filter according to this invention is shown therein which comprises a triangular right prism 1 of which the cross section is a right triangle and by a body which is defined by a first pair of planes 6–6' which form a dihedral angle and by a second pair of planes 8,8' which are parallel to each other and perpendicular to the straight line intersectant of said first pair of planes and a portion of a spherical sector 12 of which the center is located on the intersectional line 14 of the plane by which the angle between said first pair of planes and the median plane between said second pair of planes is bisected; said portion of spherical sector 12 being defined by the intersection between said spherical sector and said first pair of planes and said second pair of planes.

The light beam F emerging from a source not indicated, has an intensity which is uniform over all its cross section D—D and falls firstly perpendicular on one of the smaller faces 16 of prism 1 and then, at an angle of 45 deg, on the larger face 18 thereof and at the same angle it hits also the small area of prism 2 surrounding the point of tangency with prism 1.

According to an important aspect of the invention the materials of which the two prisms 1 and 2 are made are so chosen that the ratio between the respective refraction indexes, taking into account the wavelength of the light to be apodized, be such, first of all, that prism 1 operates, with respect to the medium in which it is immerged (f.i. air) in such a way that it gives a total reflection. In the case of the embodiment as illustrated in the drawings, prism 1 is made of quartz, prism 2 is also made of quartz and both prisms are approached in air. Because, as indicated in FIG. 1, the incidence angle of light F is 45 deg with respect to the plane of prism 1 tangential to prism 2, this ensures that, outside of the area where the distance between the two surfaces is of the order of the wavelength, the reflection of the incident light is total while in the surrounding of the punctual optical contact the transmitted light is at a maximum.

Such situation is shown in FIG. 1 wherein segment D—D represents the uniform intensity of the incident beam, curve G—G shows the intensity of the beam from the filter and curve E—E intensity of the reflected light. As it emerges from the figure, curve G—G presents a positive peak while curve E—E presents a negative peak; both peaks being correspondent to the tangency point of prism 1 and body 2 and to the surrounding of the same point.

In FIG. 3 an application of the above filter is shown in a device wherein the filter is combined with a mirror 22. In such case the result is a device which operates as an apodizing mirror.

In fact light F emerging from a source not shown and having an uniform profile D—D, when striking face 18 of prism 1, will be partly reflected (E—E) and partly transmitted towards mirror 22 with an intensity profile typical (see FIG. 1).

The rear-reflected light by mirror 22 will be transmitted again with a H—H intensity profile through the filter in the direction of source F.

In FIG. 4 an application is shown of the apodizing filter of FIG. 2 to an optical resonator comprising an active means 20 interposed between a mirror 26 and the apodizing mirror of FIG. 3. The light emerging from source 20 propagates according to the modes proper of the optical resonator with oscillations between mirrors 24, 26 each time being filtered by the apodizing filter of FIG. 1 which at the same time constitutes the optical extraction element of the same cavity.

Line M—M shows the intensity profile present in the resonator due to the apodizing filter of this invention.

The advantages obtained by the apodizing filter consist of a superior spatial quality of the beam emitted by the laser cavity due to the reiterate filtering action by the apodizing filter as referred to that obtainable without the filter or by stepped filters whereby diffractive effects are introduced.

An embodiment of the apodizing filter of this invention has been thus described along with two application embodiments of the same.

Obviously many modifications and variants to said embodiments can be contributed to the present embodiments by those skilled in the art.

However such variants and modifications will be protected by the following claims whenever they will be inspired by the concept of this invention.

We claim:

1. An apodizing filter system comprising an apodizing filter, a light source and a mirror, said filter being interposed between said light source and said mirror (22); said filter being adapted to separate the central portion from the marginal portion of a light beam passing through said filter, whereby the same beam is freed from diffraction effects and comprising first and second solid bodies of transparent material of which said first body (1) receives said light beam at a 90° angle of incidence and said second body (2) receives the light emerging from the first one; the second body having at least one curved surface (12) approached to a surface (18) of the first body at a distance therefrom not greater than some wavelengths of the light to be treated by the filter; an angle larger than the limit angle of total reflection related to said first body—with respect to the medium in which the filter is immersed—being formed with the direction of the incident light by the plane tangential to the curved surface of said second body at the minimum distance point from the surface of the first body; the refraction indexes of said bodies being such that the light indicence angle on said tangential plane is less than the limit angle of total reflection; said filter and said mirror being so conformed and arranged that the flux from said source crosses the filter whereby it splits into a first reflected part (E—E) and into a second transmitted part and that said second part (G—G) impinges on the mirror and is reflected through said filter towards the source.

2. An apodizing filter system comprising an apodizing filter and a laser cavity comprising an active means (20) and two end mirrors (24, 26) totally reflecting, said filter fitting into said laser cavity, said mirrors being respectively a concave (26) one and a convex (24) one; the apodizing filter being interposed between the convex mirror and the active means (20) and being aligned with them; said filter being adapted to separate the central portion from the marginal portion of a light beam passing through said filter, whereby the same beam is freed from diffraction effects and comprising first and second solid bodies of transparent material of which said first body (1) receives said light beam at a 90° angle of incidence and said second body (2) receives the light emerging from the first one; the second body having at least one curved surface (12) approached to a surface (18) of the first body at a distance therefrom not greater than some wavelengths of the light to be treated by the filter; an angle larger than the limit angle of total reflection related to said first body—with respect to the medium in which the filter is immersed—being formed with the direction of the incident light by the plane tangential to the curved surface of said second body at the minimum distance point from the surface of the first body; the refraction indexes of said bodies being such that the light incidence angle on said tangential plane is less than the limit angle of total reflection.

* * * * *